United States Patent
Puerkner et al.

(10) Patent No.: US 9,732,258 B2
(45) Date of Patent: Aug. 15, 2017

(54) PSA CONTAINING OLEFIN BLOCK COPOLYMERS AND STYRENE BLOCK COPOLYMERS

(71) Applicant: HENKEL AG & CO. KGAA, Duesseldorf (DE)

(72) Inventors: Eckhard Puerkner, Duesseldorf (DE); Annie Seiler, Juvigny sur Marne (FR)

(73) Assignee: HENKEL AG & CO. KGAA, Duesseldorf (DE)

( * ) Notice: Subject to any disclaimer, the term of this patent is extended or adjusted under 35 U.S.C. 154(b) by 165 days.

(21) Appl. No.: 14/284,770

(22) Filed: May 22, 2014

(65) Prior Publication Data

US 2014/0256867 A1   Sep. 11, 2014

Related U.S. Application Data

(63) Continuation of application No. PCT/EP2012/073293, filed on Nov. 22, 2012.

(30) Foreign Application Priority Data

Nov. 22, 2011   (DE) .................. 10 2011 086 845

(51) Int. Cl.

| | | |
|---|---|---|
| *C09J 147/00* | (2006.01) | |
| *C09J 7/02* | (2006.01) | |
| *C09J 153/00* | (2006.01) | |
| *C09J 153/02* | (2006.01) | |
| *C09J 193/00* | (2006.01) | |
| *C08L 23/18* | (2006.01) | |
| *C08L 53/02* | (2006.01) | |
| *C08L 93/00* | (2006.01) | |

(52) U.S. Cl.
CPC ........... *C09J 147/00* (2013.01); *C09J 7/0221* (2013.01); *C09J 153/00* (2013.01); *C09J 153/02* (2013.01); *C09J 193/00* (2013.01); *C08L 23/18* (2013.01); *C08L 53/02* (2013.01); *C08L 93/00* (2013.01); *C08L 2205/02* (2013.01); *C08L 2205/03* (2013.01)

(58) Field of Classification Search
CPC ...................................................... C09J 147/00
See application file for complete search history.

(56) References Cited

U.S. PATENT DOCUMENTS 7,199,180 B1 * 4/2007 Simmons ................. B32B 7/12
524/271
2008/0281037 A1   11/2008 Karjala et al.

FOREIGN PATENT DOCUMENTS

| EP | 0912646 B1 | 11/2002 | |
|---|---|---|---|
| JP | 2009185122 A | 8/2009 | |
| WO | 0000565 A1 | 1/2000 | |
| WO | 2005028584 A1 | 3/2005 | |
| WO | 2005090426 A1 | 9/2005 | |
| WO | 2006102150 A2 | 9/2006 | |
| WO | 2011022523 A2 | 2/2011 | |
| WO | WO 2011022523 A2 * | 2/2011 | ............ C09J 123/02 |

* cited by examiner

*Primary Examiner* — Lanee Reuther
(74) *Attorney, Agent, or Firm* — Sun Hee Lehmann

(57) ABSTRACT

The invention relates to storage-stable hot-melt adhesive containing 15 to 70 wt % of a mixture of at least one copolymer based on ethylene and/or propylene and at least one C4 to C20 α-olefin which is obtainable as a block copolymer by metallocene-catalyzed polymerization, and at least one styrene block copolymer, 10 to 70 wt % of at least one tackifying resin, 0 to 40 wt % of further additives, wherein the total of the percentages should amount to 100% and the tackifying resin is entirely or in part a soft resin.

5 Claims, No Drawings

PSA CONTAINING OLEFIN BLOCK COPOLYMERS AND STYRENE BLOCK COPOLYMERS

FIELD OF INVENTION

The invention relates to hot-melt adhesives manufactured on the basis of olefin block copolymers and styrene block copolymers, which together with additional additives are suitable as a pressure sensitive adhesive.

BACKGROUND OF THE INVENTION

Hot-melt adhesives that are suitable for adhesively bonding all kinds of materials are widely known. In EP0912646, hot-melt adhesives are described that are manufactured from an essentially linear copolymer of ethylene together with at least one $C_3$ to $C_{20}$ α-olefin monomer. WO 00/00565 also describes hot-melt adhesives that are manufactured on the basis of linear α-olefin copolymers. The usual auxiliary components are described therein, e.g. tackifying resins, waxes, additional different polymers, styrene block copolymers, plasticizers or other additives. The adhesive bonding of paper and cardboard materials is described as an intended use as well as a use as an adhesive tape or for bookbinding. Olefinic block copolymers are not described.

Adhesives based on selected $C_2$-α-olefin copolymers are described in WO 2006/102150. These copolymers and their manufacture are also described for example in WO 2005/090426. Specific catalysts and transfer compounds are mentioned in this regard. In addition to other products, adhesives are also described. Here it is noted, however, that the composition of the ingredients of the adhesives, their properties and their specific applications are only given in the form of lists, enumerations and are stated as a result to be achieved. A clear disclosure of particular adhesive compositions is not given. Various general properties are described, especially the viscosity.

In WO 2005/028584 are described hot-melt adhesives, comprising polyolefin polymers manufactured by metallocene catalysis. These polymers should have a viscosity of up to 9000 mPas at a temperature of 149° C., the viscosity of the hot-melt adhesive itself being less than 2000 mPas.

In U.S. 2008/0281037 polymers and hot-melt adhesives are described, inter alia olefin block copolymers also manufactured by metallocene catalysis. Mixtures with styrene block copolymers are not described.

BRIEF SUMMARY OF THE INVENTION

Hot-melt adhesives can be manufactured from the known olefin copolymers. In this regard, the olefin copolymers can be varied broadly. Styrene block copolymers are likewise widely commercially available. They can be manufactured with a broad spectrum of properties; in particular they are elastic polymers. However, it has been shown that olefin copolymers are not sufficiently compatible with styrene block copolymers. In practice this leads to the fact that adhesives composed of such mixtures are neither storage-stable nor at application in the melt. Thereby the polymers can undergo partial demixing and then they cannot be applied, or they migrate to the surface and thus later on reduce the adhesion to the substrates. This means that such mixtures are unsuitable as a permanently tacky pressure-sensitive adhesive. Moreover, it has to be ascertained that there exists a good permanent pressure-sensitive adhesion. In this regard, some styrene block copolymers result in non-tacky surfaces. If the tack is increased for example by plasticizers, the cohesion is reduced, such that an adhesive layer tears and the adhesive bond fails.

Consequently, the object of the present invention is to provide hot-melt adhesives that consist of a mixture of olefin block copolymers and styrene block copolymers. The hot-melt adhesive should have a suitable viscosity that allows an application in a thin layer and onto temperature-sensitive substrates. The resulting layers should exhibit contact adhesive properties that are not impaired due to storage of the adhesive. Here, the adhesive layers should exhibit a good elastic behavior in bonding.

The object is achieved by a hot-melt adhesive comprising (i) 15 to 70 wt % of a mixture of at least one copolymer based on ethylene and/or propylene and optionally at least one C4 to C20 α-olefin that is obtainable as a block copolymer by metallocene-catalyzed polymerization, and at least one styrene block copolymer, (ii) –10 to 70 wt % of at least one tackifying resin, (iii) 0 to 40 wt % of further additives and plasticizer, wherein the sum of the percentage shares should amount to 100% and the tackifying resin is entirely or partially a soft resin that is liquid at a temperature of below 50° C.

Another subject matter of the invention is the use of such hot-melt adhesives for coating films, tapes, labels and other flat substrates in order to produce a pressure sensitive layer. Another subject matter of the invention concerns films, adhesive tapes and labels, which on at least one side, possess a pressure sensitive adhesive layer of an adhesive according to the invention.

Olefin copolymers based on ethylene and at least one C3 to C20 α-olefin are a necessary component of the pressure-sensitive adhesive according to the invention. These polyolefins are manufactured by metallocene catalysis. One embodiment of the invention uses such co- or terpolymers based on ethylene together with C4 to C20 α-olefins. The monomers that can be additionally added to the ethylene or propylene are the olefinic unsaturated monomers known to be copolymerizable with ethylene or propylene. They particularly concern linear or branched C4 to C20 α-olefins, such as butene, hexene, methylpentene, octene; cyclic unsaturated compounds like norbornene or norbornadiene; symmetrically or unsymmetrically substituted ethylene derivatives, wherein C1 to C12 alkyl residues are suitable substituents; as well as optional unsaturated carboxylic acids or carboxylic acid anhydrides. Here, they can be homopolymers, copolymers, terpolymers, which can also comprise further monomers. In the following, copolymers should be understood to also mean those polymers of more than 2 monomers. In this case the amount of α-olefin comonomers should be less than 20%.

Another embodiment contains copolymers based on ethylene and propylene. When required, it is possible for additional minor amounts of C4 to C20 α-olefins to also be comprised. They are likewise manufactured by metallocene catalysts. In this regard the fraction of propylene should be above 60 wt %, in particular the fraction of propylene should be above 70 wt %. Minor amounts of other α-olefin monomers can optionally be contained, the amount should be less than 5%; however, ethylene/propylene block copolymers are particularly suitable.

DETAILED DESCRIPTION OF THE INVENTION

The thus obtained (co)polymers have a molecular weight of 2000 up to 250,000 g/mol, in particular from 5000 up to 100,000 g/mol (number average molecular weight, $M_n$ determined by GPC). These (co)polymers are characterised in that they have a narrow molecular weight distribution. The molecular weight distribution, expressed as $M_w/M_n$, should be 2.5 for example, especially less than 2.3. Such polymers are known in the literature and can be commercially obtained from various manufacturers. Exemplary suitable polymers are commercially available under the trade names VISTAMAX® or INFUSE®.

The suitable copolymers according to the invention are block copolymers. In this regard the blocks possess a different monomer composition. In one embodiment the suitable hot-melt adhesives according to the invention possess one glass transition temperature; in another embodiment the copolymers should possess two glass transition temperatures. The first glass transition temperature ($T_g$) (measured by DTA) should be in the range between –100 to 0° C., especially between –80 to –10° C. The second glass transition temperature should be in particular below –100° C.

In particular, those olefinic block copolymers are suitable that are manufactured by catalysis with metallocene compounds. The melt index of these polymers should be from 5 g/10 min to 200 g/10 min, preferably up to 100 g/10 min (measured at 190° C., 2.16 kg, DIN ISO 1133). The softening point of the polymers should be above 130° C., in particular above 160° C. The amount of these copolymers should range from 5 to 50 wt %, relative to the hot-melt adhesive, in particular between 15 and 30 wt %. The (co)polymer can concern one polymer, but it is also possible to employ a mixture.

A pressure-sensitive adhesive (PSA) according to the invention has to comprise at least one thermoplastic elastic styrene block copolymer as an additional ingredient. This preferably concerns a triblock copolymer, although diblock copolymers may be employed or also mixtures of both types. Such block copolymers are poorly compatible with the olefin block copolymers.

Various types of styrene block copolymers may be concerned.

Examples of these are styrene-isoprene block copolymers (SIS), styrene-isoprene-butadiene block copolymers (SIBS), styrene-butadiene block copolymers (SBS), hydrogenated forms of the copolymers, such as SBBS, SEBS, SEPS, SIPS or their mixtures, as well as the corresponding diblock copolymers. Such polymers are known to the person skilled in the art and are commercially available. They have a molecular weight ($M_n$) of 10,000 to 500,000 g/mol, in particular 70,000 to 300,000 g/mol. In particular, non-hydrogenated forms are preferred.

The amount of additionally contained styrene block copolymers to the olefin block copolymers ranges from 3 to 35 wt %, in particular from 5 to 25 wt %, relative to the hot-melt adhesive. The amount of these block copolymers influences the elasticity of the adhesive. If the amounts of the block copolymers are too high, then the adhesive is too elastic and can be difficult to process. Moreover, incompatibilities are increasingly observed which lead to poor adhesive properties. If the amount is too low, then the cohesion of an adhesive layer is decreased.

The pressure-sensitive adhesive according to the invention contains at least one tackifying resin as an additional component. The resin causes an additional tackiness to the adhesive. It is added in an amount of 10 to 60 wt %, preferably 10 to 40 wt %. It is according to the invention necessary that the resins at least partially contain a soft resin that is liquid or flowable below 50° C. This can be determined from the dropping point. In this regard, resins can be selected from aromatic, aliphatic or cycloaliphatic hydrocarbon resins, as well as modified or hydrogenated derivatives. Other resins that can be employed in the context of the invention are polyterpene resins, phenolic or aromatic modified polyterpene resins, modified natural resins such as resin acids from balsamic resin, tall oil resin or wood rosin, optionally also hydroabietyl alcohol and its esters, acrylic acid copolymers, such as styrene-acrylic acid copolymers and resins based on functional hydrocarbon resins.

Usual resins have a low molecular weight of less than 2000 g/mol, especially less than 1500 g/mol. They can be chemically inert or they can optionally comprise functional groups, such as for example OH groups, carboxylic groups or double bonds. According to the invention, soft resins that have a dropping point below 50° C., particularly below 35° C., should therefore be selected (Mettler dropping point according to ASTM D-3104). As additional resins, those resins that have a softening point between 70 and 130° C. (ring and ball method, DIN 52011) can also be employed. Preferably rosins and in particular fully or partially hydrogenated hydrocarbon resins are employed. In this regard, the amount of resins that are solid at room temperature can be up to 50% of the total quantity of resin.

Plasticizers are preferably used to adjust the viscosity or the flexibility and are generally comprised in a concentration of 0 to 25 wt %, preferably 2 to 15 wt %. Suitable non-polar plasticizers include synthetic oils, paraffin oils, naphthenic oils or polyisobutylenes. They concern for example medicinal white oils, naphthenic mineral oils, polypropylene-, polybutene-, polyisoprene oligomers, hydrogenated polyisoprene- and/or polybutadiene oligomers, paraffinic hydrocarbon oils.

In order to obtain a high tack and good cohesion it is preferred that the sum of soft resin and plasticizer is from 10 to 35 wt %.

As additional components, the pressure-sensitive hot-melt adhesive according to the invention contains additives that can influence certain properties of the adhesive, such as e.g. cohesion strength, viscosity, softening point or processing viscosity. In this regard, for example stabilizers, waxes, adhesion promoters, antioxidants, light stabilizers, color pigments, rheological agents or similar additives are concerned. The amount should be up to 15 wt %. A plurality of additives can also be incorporated as a mixture. In addition, fillers may be incorporated to increase strength. Minor amounts of plasticizers as the glycerin, benzoate or phthalate esters or polyglycol ethers can also be employed to adjust the properties.

Waxes in quantities of 0 to 5 wt % may optionally be added to the pressure-sensitive hot-melt adhesive. The quantity is measured such that, on the one hand, the viscosity is adjusted, on the other hand, the adhesion is not adversely affected. The wax may be of natural or synthetic origin. Employable as natural waxes are vegetable waxes, animal waxes; mineral waxes or petrochemical waxes are employable as synthetic waxes. However, waxes should preferably not be comprised.

Stabilizers are another group of additives. They serve to protect the polymers from decomposition during the processing. In this regard, the antioxidants are in particular noteworthy. They are usually added to the pressure sensitive hot-melt adhesive in quantities of up to 3 wt %, preferably in quantities of about 0.1 to 1 wt %. Such additives are known in principle to the person skilled in the art.

He can make a selection according to the desired properties of the hot-melt adhesive.

Moreover, the pressure-sensitive hot-melt adhesive according to the invention can contain adhesion promoters. Adhesion promoters are substances that improve the adhesion of the hot-melt adhesive to the substrate being bonded. In particular, adhesion promoters are intended to improve the ageing behavior of adhesive bonds under the influence of humid atmospheres. Typical adhesion promoters are, for example, ethylene/acrylamide comonomers, polymeric isocyanates, reactive organosilicon compounds or phosphorus derivatives. They can also influence the wetting characteristics of the adhesive and thus the adhesion behavior on the substrates.

A preferred embodiment of the pressure-sensitive hot-melt adhesive contains 15 to 30 wt % of a block copolymer based on ethylene and/or propylene and optionally at least one C4 to C20 α-olefin which is obtained by metallocene-catalyzed polymerization, and 5 to 35 wt % of at least one styrene block copolymer, 5 to 35 wt % of at least one tackifying resin that is liquid below 50° C., 0 to 25 wt % of a non-polar plasticizer as well as 0 to 15 wt % of other additives, wherein the sum of the percentage shares should be 100%.

The pressure-sensitive hot-melt adhesive according to the invention is manufactured by means of known processes by blending in the melt. In this regard, all the components can be charged, and heated together at the same time and then homogenized, or the lower melting components can be charged and blended, and then the additional resin components are added. It is also possible to manufacture the hot melt adhesive continuously in an extruder. The suitable hot-melt adhesive is solid and, apart from impurities, free of solvents.

The viscosity of the suitable hot-melt adhesive according to the invention should be from 3000 to 50,000 mPas, preferably from 5000 to 30,000, in particular greater than 10,000 mPas, measured at the application temperature. This is between 140 and 190° C. (Brookfield, EN ISO 2555, measured at the stated temperature).

The pressure-sensitive hot-melt adhesives according to the invention are suitable for bonding the all kinds of materials. Thus, materials such as polyolefin films can be bonded to one another, for example polyethylene films or polypropylene films, polyolefin nonwovens, for example polyethylene nonwovens or polypropylene nonwovens, polyurethane films, polyurethane foams, films of cellulose derivatives, polyacrylate or polymethacrylate films, polyester films, in particular polylactide, polycaprolactone, polyester amide. In this regard, the molten adhesive is applied onto a substrate and then adhesively bonded to a second substrate.

Another preferred embodiment applies the adhesive according to the invention as an adhesive layer onto a carrier. The carriers concern the known flexible films that are also suitable as an adhesive tape. These non-tacky films are coated with a hot-melt adhesive according to the invention on one or both surfaces. The layer thickness of the applied adhesive ranges for example from 50 to 500 g/m² (ca. 50 to 500 μm). The layer thickness is particularly intended to be from 100 to 350 g/m².

These adhesive layers posses a good adhesion to the carrier material. Such carrier films usually possess a non-stick coated back side that can be easily separated from the pressure-sensitive adhesive layer.

A specific category of usage of the hot-melt adhesives in accordance with the invention is the coating of self-adhesive films, tapes or labels with an adhesive layer. Here, tapes or films, based for example on polyolefins or polyesters, are coated with the inventively suitable hot-melt adhesive. In this case, a permanently sticky adhesive layer is obtained by choosing an appropriate adhesive. These materials can then be converted. Permanent adhesive films, labels and tapes can be manufactured in this way. The thus obtained self-adhesive surfaces can optionally be covered by non-adhesively coated materials.

The adhesives according to the invention are cloudy. At room temperature a 1 cm thick layer is opaque. However, there is no bleeding of the individual ingredients, thus the bond strength of the nonbonded layer or to adhesively bonded substrates is also not diminished. Adhesives according to the invention are stable in the melt and no phase separation occurs in the molten state even with longer storage times. The adhesives used according to the invention exhibit a good tack. The layers are elastic and exhibit a good cohesive bond. The two block copolymers form a stable mixture that does not lead to a phase separation. Thus one obtains high adhesion.

The adhesives according to the invention are known as a coating for film applications. The corresponding coated products can be employed in many areas of application, for example as adhesive tapes or labels, multi-layer films for use as tamper-proof seals, for packaging, in sanitary products or in medical applications.

EXAMPLES

Example 1

| 20 parts | ethylene/octene copolymer | (Infuse D 9808) OBC |
|---|---|---|
| 5 parts | SBS | (Kraton D 1118) styrene block copolymer |
| 5 parts | SIS | (Kraton D 1126) styrene block copolymer |
| 30 parts | resin | (Escorez 5320) |
| 10 parts | soft resin, | (Sylvatac RE12) liquid resin |
| 20 parts | naphthenic oil | (Nyflex 222B) |
| 1 part | stabilizer | (Irganox B 225) antioxidant |

Viscosity: 27 500 mPas, 150° C.
Viscosity: 15 300 mPas, 170° C.

In a thin layer the adhesive is cloudy in the solid or molten state (visual assessment).

A backing film (PE, 50 μm) was coated with ca. 250 g.

Once cooled, a film was bonded to a glass plate, pushed with a roller (1 kg) and stored for 24 hours at 25° C. The bond strength was then measured at specified times.

| 20 min | 50 N/25 mm |
|---|---|
| 24 h | 60 N/25 mm |
| 3 d | 60 N/25 mm |

The adhesion remained constant even after storage and no bleeding of the incompatible components occurred.

Comparative Example 2

| 20 parts | ethylene/octene copolymer | (Infuse D 9808) OBC |
|---|---|---|
| 8 parts | SBS | (Kraton D 1118) styrene block copolymer |
| 8 parts | SIS | (Kraton D 1126) styrene block copolymer |
| 43.5 parts | resin | (Regalite R 1125) |
| 20 parts | polyisobutylene | (Parapol 1300) |
| 0.5 parts | stabilizer | (Irganox B 225) antioxidants |

Viscosity: 51 200 mPas, 170° C.

In a thin layer the adhesive is cloudy in the solid or molten state (visual assessment).

The bond strength of a coated film is low (measured as loop tack, ASTM D 6195).

Comparative Example 3

| | | |
|---|---|---|
| 20 parts | ethylene/octene copolymer | (Infuse D 9808) OBC |
| 5 parts | SBS | (Kraton D 1118) styrene block copolymer |
| 5 parts | SIS | (Kraton D 1126) styrene block copolymer |
| 40 parts | resin | (Escorez 5320) |
| 10 parts | resin | (Foral 85) |
| 10 parts | naphthenic oil | (Nyflex 222B) |
| 0.5 parts | stabilizer | (Irganox B 225) antioxidants |

Viscosity: 42 700 mPas, 150° C.
Viscosity: 19 200 mPas, 170° C.

The bond strength of a coated film (loop tack) is low.

We claim:

1. A hot-melt adhesive comprising:
   (A) a mixture of (i) 15 to 30 wt % a metallocene-catalyzed block copolymer, which is an ethylene and/or propylene and at least one C4 to C20 α-olefin, and (ii) 5 to 25 wt % of a styrene block copolymer;
   (B) 10 to 40 wt % of at least one tackifying resin, wherein the at least one tackifying resin is entirely liquid at room temperature; and
   (C) 0 to 40 wt % of further additives selected from plasticizer, wax, stabilizer, adhesion promoter, antioxidant, light stabilizer, colorant, rheological agent, and mixtures thereof;
   wherein the total amount of the at least one tackifying resin and the plasticizer is from 10 to 35 wt %;
   wherein the sum of the %-shares should amount to 100%; and
   wherein the viscosity of the hot-melt adhesive is between 10000 mPas and 50,000 mPas at 150° C.

2. The hot-melt adhesive according to claim 1 wherein the styrene block copolymer is selected from non-hydrogenated block copolymers.

3. The hot-melt adhesive according to claim 2 wherein the styrene block copolymer is selected from the group consisting of SIS, SBS and SIBS.

4. The hot-melt adhesive according to claim 1 wherein the hot-melt adhesive is cloudy at room temperature.

5. The hot-melt adhesive according to claim 1 wherein the plasticizer include a nonpolar plasticizers selected from the group consisting of synthetic oils, paraffinic oils, naphthenic oils, poly(isobutylene) oils and mixtures thereof.

* * * * *